March 26, 1940.　　　　F. R. IBAÑEZ　　　　2,194,661
ARTICULATED MECHANISM FOR THE TRANSMISSION OF MOVEMENT
Filed April 24, 1939
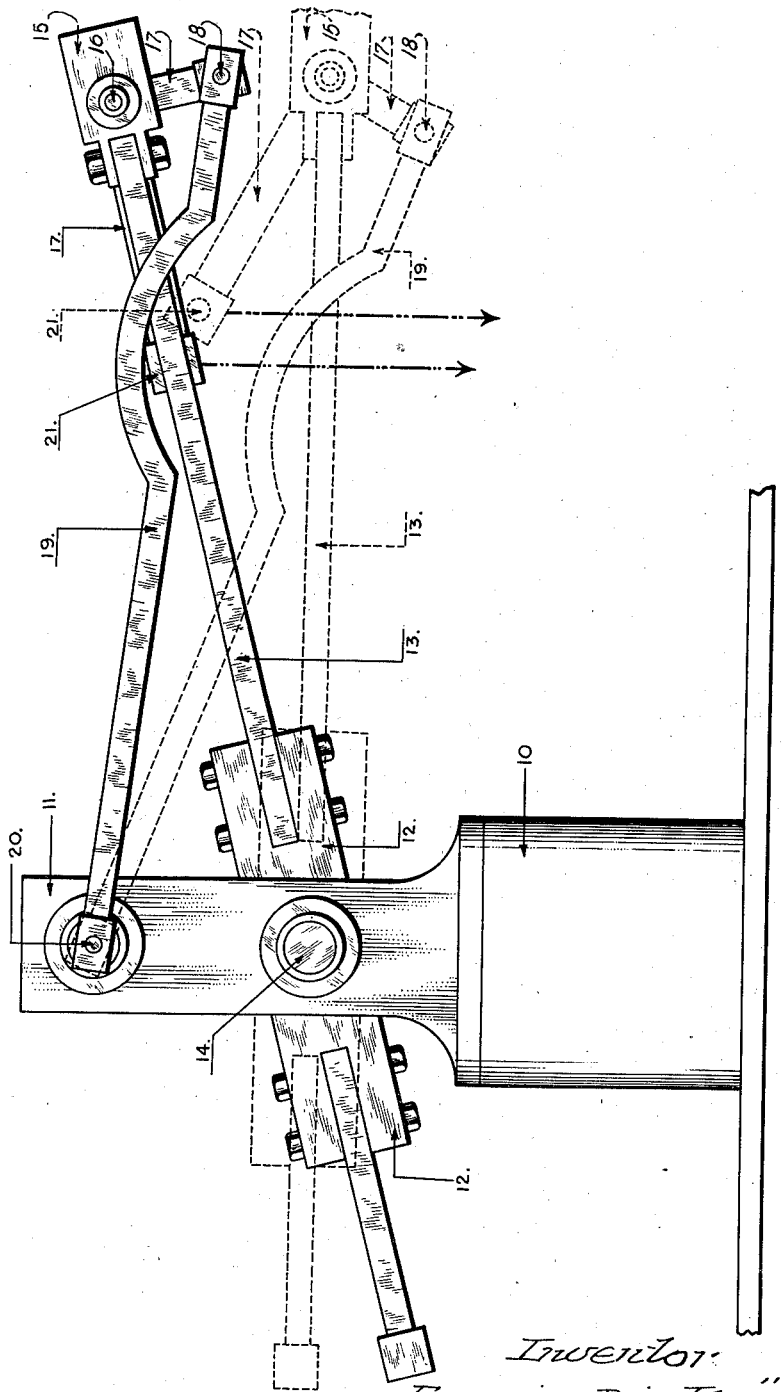
Inventor
Francisco Roig Ibañez
By [signature]
Atty.

Patented Mar. 26, 1940

2,194,661

UNITED STATES PATENT OFFICE 2,194,661

ARTICULATED MECHANISM FOR THE TRANSMISSION OF MOVEMENT

Francisco Roig Ibañez, Mexico, D. F., Mexico

Application April 24, 1939, Serial No. 269,752
In Mexico August 23, 1938

1 Claim. (Cl. 74—105)

This invention relates to mechanical movements in general and more particularly relates to a useful and novel articulated mechanism for transmitting movement.

The primary object of this invention is to utilize a series of associated levers combined and arranged in a particular manner as a substitute for the conventional gears, belts and conventional lever arrangement. The result gained is a simplified linkage association through which the power application is effectively transmitted to the power take off through the use of two levers and a tie rod so associated with both levers as to compel power responsive reciprocating movement as applied to one of such levers to cause reciprocating movement of the other lever to produce power.

The detailed features of the present mechanical arrangement are clearly apparent from the following description as well as with the attached drawing to illustrate it; the figures or numerals of reference in it indicating the different parts of the unit hereby described and henceforward claimed.

In the drawing:

The figure shows an elevation of the present mechanism or mechanical movement, according to the principles of the present invention, in which the different parts embodied are clearly apparent. Said mechanism is shown with dotted lines in another of its positions.

As shown in the attached drawing, the present mechanism comprises a central support member 10, in whose upper rod 11, the lever 12 rotates and is supported, same being of any shape or section as convenient, and according to the requirements of the case. The lever rotates with or on the axis 14, located in the support member 11; in this way the lever on said support has in or with said axis a radial rocking movement.

The invention consists of an articulation of levers characterized in the following:

1. At the extremity of a lever, 14—16, of first or second class there is provided an axis on or with which there rotates a lever of the second class, 21—16—18, having unequal arms. The axis 16 constitutes one of the points of articulation between both levers.

2. The motive power is applied at the extremity 21 of the long arm of the second lever, 21—16—18.

3. The extremity of the smaller arm 18 of the second lever, which through the provision of the tie rod 19 is the fulcrum of the lever and is mobile, constitutes another point of articulation with the first lever.

4. The shape of this second lever may be varied.

At the opposite end of the member 13, of said lever which could be, for instance, the member 15, a shaft 16 is located, with or upon which the lever 17 rotates, being of any section and preferably of an angular shape. To one of the arms of this new lever 17, a tie rod 19 is pivoted through the shaft 18 said tie rod uniting the arm of said lever with an axis or supporting point 20 mounted in the same support 11, but independent of the axis 14, in which the lever formed by members 12 and 13 rotates.

On the opposite arm, that is on the end 21 of the lever 17, the motive power will be applied.

The invention is particularly useful in permitting the use of a rotary or rotary reciprocating power applied to the lever 21 and converting the same to a substantially reciprocating movement at the power take off lever 13. Thus the device is of utility where movement is required, in well reciprocating rods, and may be used where gear and belt drive are found to be retractable. The power end of the bell crank may receive power from a pitman and the power take off from the arm may be directed to a plunger. It is thus apparent that the device has utility and the extent or degree of that utility is unimportant.

Having thus described the invention, what I consider as new and desire to secure by Letters Patent is:

A mechanism for converting reciprocating to reciprocating motion, comprising a support, an arm pivoted at one end thereof, a bell crank pivoted at the apex thereof adjacent the free end of said arm, and a link pivoted at one end thereof to said support and at its opposite end to one end of said bell crank, whereby the opposite end of said bell crank may receive power from a pitman and power may be taken off of said arm by a plunger.

FRANCISCO ROIG IBAÑEZ.